US010432923B2

(12) United States Patent
Lee et al.

(10) Patent No.: US 10,432,923 B2
(45) Date of Patent: Oct. 1, 2019

(54) 3D DISPLAY SYSTEM (71) Applicant: Korea Photonics Technology Institute, Buk-gu (KR)

(72) Inventors: Kwang Hoon Lee, Anyang-si (KR); Dong Kil Lee, Buk-gu (KR); Yang Gyu Kim, Buk-gu (KR)

(73) Assignee: KOREA PHOTONICS TECHNOLOGY INSTITUTE, Buk-Gu, Gwangju (KR)

( * ) Notice: Subject to any disclaimer, the term of this patent is extended or adjusted under 35 U.S.C. 154(b) by 140 days.

(21) Appl. No.: 15/304,110

(22) PCT Filed: Apr. 23, 2015

(86) PCT No.: PCT/KR2015/004051
§ 371 (c)(1),
(2) Date: Oct. 14, 2016

(87) PCT Pub. No.: WO2015/163705
PCT Pub. Date: Oct. 29, 2015

(65) Prior Publication Data
US 2017/0041599 A1 Feb. 9, 2017

(30) Foreign Application Priority Data
Apr. 23, 2015 (KR) .......................... 10-2014-0049351

(51) Int. Cl.
*H04N 13/398* (2018.01)
*H04N 13/302* (2018.01)
(Continued)

(52) U.S. Cl.
CPC ....... *H04N 13/398* (2018.05); *G02B 27/2214* (2013.01); *H04N 13/302* (2018.05); *H04N 13/305* (2018.05)

(58) Field of Classification Search
CPC ............... H04N 13/398; H04N 13/302; H04N 13/0497; H04N 13/0402; G02B 27/2214; G02B 27/22

See application file for complete search history.

(56) References Cited

U.S. PATENT DOCUMENTS

2007/0146845 A1\* 6/2007 Hirabara ............ G02B 27/2264
359/23
2007/0147067 A1\* 6/2007 Chuang .................. G02B 6/001
362/600
(Continued)

FOREIGN PATENT DOCUMENTS

JP 09269741 10/1997
JP 1078562 3/1998
(Continued)

OTHER PUBLICATIONS

International Search Report for PCT/KR2015/004051 dated Jul. 20, 2015.
(Continued)

*Primary Examiner* — Tat C Chio
(74) *Attorney, Agent, or Firm* — Dilworth & Barrese, LLP.; Michael J. Musella, Esq.

(57) ABSTRACT

A unit light source module configured as a 3D display system includes a light emitting unit including a plurality of point light sources corresponding to a number of viewpoints and a light collecting unit disposed a predetermined distance apart from the light emitting unit and collecting and outputting the light source outputted from the plurality of point light sources.

25 Claims, 11 Drawing Sheets (51) Int. Cl.
    *G02B 27/22*     (2018.01)
    *H04N 13/305*     (2018.01)

(56) References Cited

U.S. PATENT DOCUMENTS

| 2008/0316596 A1* | 12/2008 | Cha | G02B 27/2214 |
| | | | 359/463 |
| 2012/0242568 A1* | 9/2012 | Kim | G02B 27/2214 |
| | | | 345/156 |
| 2013/0222714 A1* | 8/2013 | Uehara | H04N 13/0235 |
| | | | 349/15 |

FOREIGN PATENT DOCUMENTS

| JP | 2007522525 | 8/2007 |
| WO | WO2011006835 A1 | 1/2011 |
| WO | WO2015163705 | 10/2015 |

OTHER PUBLICATIONS

ISA-237 for PCT/KR2015/004051 dated Jul. 17, 2015.
English Abstract of JP2007522525A dated Aug. 9, 2007.
English Abstract of JP10-78562 dated Mar. 24, 1998.
English Abstract of JP9-269741 dated Oct. 14, 1997.

\* cited by examiner

3D DISPLAY SYSTEM

PRIORITY

This application is a National Stage filing under 35 U.S.C. § 371 of, and claims priority via, International Application No. PCT/KR2015/004051 for 3D DISPLAY SYSTEM, filed Apr. 23, 2015, and pursuant to 35 U.S.C. § 119, this application also claims the benefit of earlier filing date and right of priority to Korean Patent Application Number 10-2014-004935, filed on Apr. 24, 2014. The entire content of PCT/KR2015/004051 is hereby incorporated by reference. The entire content of Korean Patent Application Number 10-2014-004935 is hereby incorporated by reference.

BACKGROUND

Recent development trend of 3D display industries is to overcome a single technological limit consistent with the display aspect, and to re-configure in a convergence type with various technologies in order to activate a potential market.

The topic of initial 3D technologies was 'implementation of effective depth feeling', but the current topic is transferred to 'implementation of disharmony-free natural 3D', and as a result, various 3D implementing technologies in response thereto are being developed and researched.

The ultimate goal of 3D display is to provide a 3D image with high realism (sense of reality and presence) free from disharmony. Although there is no difference of opinions that a large holographic display can satisfy the 3D image with high realism free from disharmony, the current technologies may have difficulties that have to be solved, and therefore it is expected that producibility and commercialization will take some time.

Although the glasses method has enabled approach to commercialization using the advantages of degree of freedom in viewpoint during 3D implementation being great, and transferability between 2D and 3D, discomfort in wearing glasses and lack of motion parallax provide a bit of insufficiency in creating a natural 3D environment.

In contrast, the glasses-free method has an advantage of solving the discomfort resultant from using glasses and partially accommodating the characteristics of holographic method as well, and therefore, the glasses-free method is being quickly researched and developed for commercialization. However, a high crosstalk (optical signal noise), degradation in degree of freedom in viewpoint during 3D implementation, and inducement of fatigue on eyes during long time of viewing act as an impediment factor to commercialization and market formation.

Nonetheless, the reason of the glasses-free method being currently focused over other methods lies in the fact that the glasses-free method can provide natural motion parallax in response to development of multiple view/super multiple view technology implementation, and possibility of 3D implementation with high realism free from disharmony is regarded as the highest method at the present technological level when large screen technologies are is interlinked.

Hence, it is expected that the technology for implementation of super large auto-stereoscopic 3D display (glasses-free 3D display) is not only a core promising technology for creating a high added value based on high realism such as 3D advertisement-display fields by doing away with red ocean inclined to small/medium electronic fields including mobile terminals and televisions, but also a technology leading the blue ocean markets of large electronic fields.

However, the auto-stereoscopic 3D display (glasses-free 3D display) based on a conventional single panel method suffers from disadvantages of being difficult in implementing the large-sized displays.

DETAILED DESCRIPTION OF DRAWINGS

The teachings in accordance with the exemplary embodiments of the present disclosure relate generally to a 3D display system configured to implement a large display by connecting unit light source modules.

An object of the present disclosure is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, in one general aspect of the present disclosure, there is provided a unit light source module of 3D display system, the unit light source module comprising:

a light emitting unit including a plurality of point light sources corresponding to the number of viewpoints; and a light collecting unit configured to output a light outputted from the plurality of spot light sources by collecting the light while being spaced apart at a predetermined distance from the light emitting unit.

Preferably, but not necessarily, the plurality of point light sources may be independently implementable of white color, and continuously arranged along a predetermined center distance.

Preferably, but not necessarily, the center distance may be determined by viewing distance, a center distance of adjacent visual field and a distance between the light collecting unit and the light emitting unit.

Preferably, but not necessarily, width of the point light source may be wider than or equal to the center distance.

Preferably, but not necessarily, width of the point light source may be narrower than or equal to the center distance.

Preferably, but not necessarily, the plurality of point light sources may respond to an image coordinate of an image corresponding to the number of viewpoints.

Preferably, but not necessarily, the light collecting unit may include a cylinder type lens or a rotational symmetry type lens.

Preferably, but not necessarily, the light collecting unit may include an element of single refractive medium or multiple refractive medium configured to perform the function of cylinder type lens or rotational symmetry type lens.

Preferably, but not necessarily, the element of multiple refractive medium may form a difference of optical refractive power between media in response to external stimulus in a medium formed with one or more refractive indexes.

Preferably, but not necessarily, an optical property in the element of multiple refractive medium may be such that a sum of total refractive powers formed by external stimulus is a positive value, and implements a real image.

Preferably, but not necessarily, the element of multiple refractive medium may be such that a sum of total refractive powers is a positive value or zero depending on whether external stimulus is present or absent, through which a function of changing 3D/2D is implemented.

Preferably, but not necessarily, a cross-section of a lens in the element of single refractive medium may include any one of plano-convex, bi-convex and equi-convex, and a sum of total refractive powers is a positive value, and a real image is implemented.

Preferably, but not necessarily, a distance between a principal plane of the lens and the light emitting unit may be set in response to an object distance in a lens maker's Equation.

Preferably, but not necessarily, a final curved surface of the lens may be a spherical surface or an aspherical surface.

Preferably, but not necessarily, the lens may take a parallel light type in which light flux that proceeds by being emitted from a final curved surface of the lens has a path parallel with a principal light emitted from a unit pixel of each viewpoint image, or may take a convergent light type in which an area of light flux converged on viewing surface positioned by a viewer is minimized.

Preferably, but not necessarily, a distance between centers of lenses of adjacent unit light source modules may be smaller than width of the light emitting unit.

Preferably, but not necessarily, the light collecting unit may be so arranged as to be spaced apart at a predetermined distance from the light emitting unit to enable a translational motion to a horizontal direction.

Preferably, but not necessarily, the present disclosure may further comprise:

a power source applied to the plurality of point light sources at a same position as that of the plurality of point light sources of the light emitting unit and a connection terminal unit to which grounding of data is provided, and a connector provided on at least two corners of the connection terminal unit in order to be connected with adjacent unit light source modules.

Preferably, but not necessarily, the connector may include a flexible substrate.

In another general aspect of the present disclosure, there is provided a 3D display system, the 3D display system comprising:

a light emitting unit including a plurality of point light sources corresponding to the number of viewpoints; and a light collecting unit configured to output a light outputted from the plurality of spot light sources by collecting the light while being spaced apart at a predetermined distance from the light emitting unit;

a power source applied to the plurality of point light sources at a same position as that of the plurality of point light sources of the light emitting unit and a connection terminal unit to which grounding of data is provided, and a unit light source module including a connector provided on at least two corners of the connection terminal unit in order to be connected with adjacent unit light source modules; and a controller configured to provide a driving signal for controlling the plurality of point light sources through the connector, wherein the plurality of unit light source modules is connected by the connector of the unit light source modules.

Preferably, but not necessarily, the connector may include a flexible substrate.

Preferably, but not necessarily, the plurality of unit light source modules may be arranged on a planar installation surface to be connected by the connector.

Preferably, but not necessarily, the controller may sequentially drive a point light source corresponding to a predetermined viewpoint at the plurality of unit light source modules.

Preferably, but not necessarily, the plurality of unit light source modules may be arranged on an installation surface, which is a curved surface, to be connected by the connector.

Preferably, but not necessarily, the controller may controllably form a same visual field by changing a position of a point light source configured to light up in response to a phase difference of point light source in case of an installation surface being flat, when a phase difference of any one installation surfaces in the plurality of unit light source modules is generated.

The present disclosure has an advantageous effect in that a problem caused by difficulty in creating a large screen product which is a drawback of auto-stereoscopic 3D display in the conventional single panel method can be solved, and a natural 3D image with high resolution and high realism (sense of reality and presence) free from disharmony can be provided.

Another advantageous effect is that the present disclosure can be utilized in the super large 3D advertisement-display fields for installation on a curved or planar external wall of a building or installation on an outdoor advertisement, and it is possible to implement a display of free shape by connecting unit light source modules in response to a free shape of an installation surface.

Reference will now be made in detail to embodiments, examples of which are illustrated in the accompanying drawings. In the following detailed description, numerous specific details are set forth in order to provide a thorough understanding of the present disclosure. However, this disclosure may, however, be embodied in many different forms and should not be construed as limited to any specific structure or function presented throughout this disclosure. Thus, the disclosure described herein is intended to embrace all such alternatives, modifications, variations and applications as may fall within the spirit and scope of the appended claims. As used herein, the term of viewpoint(s) and view(s) may be interchangeably used.

Now, exemplary embodiments of the present disclosure will be described in detail with reference to the accompanying drawings.

In order to solve the problem of resolution of viewpoint image being degraded in response to increased number of viewpoints in the auto-stereoscopic 3D display (glasses-free 3D display) based on conventional single panel, the present disclosure proposes a unit light source module in response to a unit pixel of conventional single panel.

Figure 1:
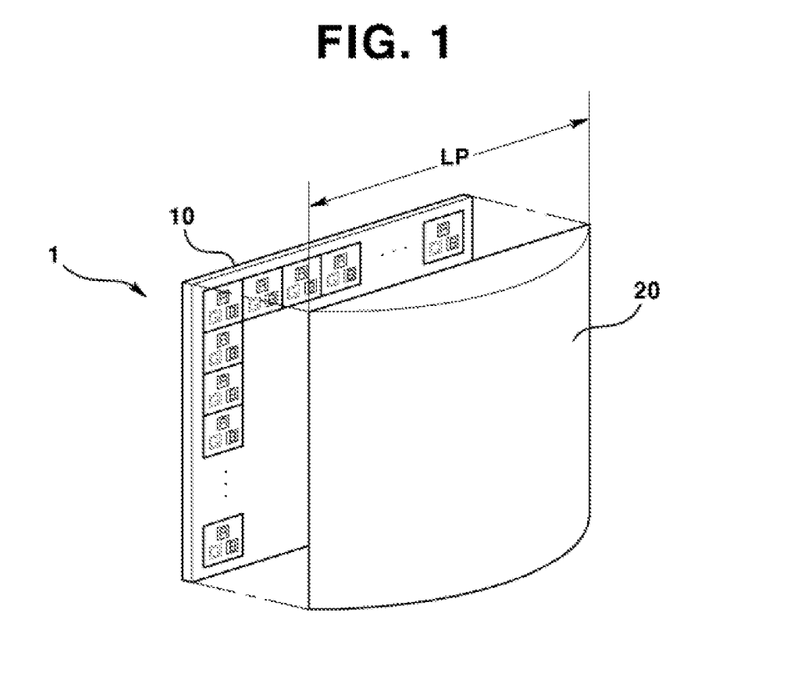
FIG. 1 is a schematic exemplary view illustrating a unit light source module of a 3D display system according to an exemplary embodiment of the present disclosure.
Figure 2:
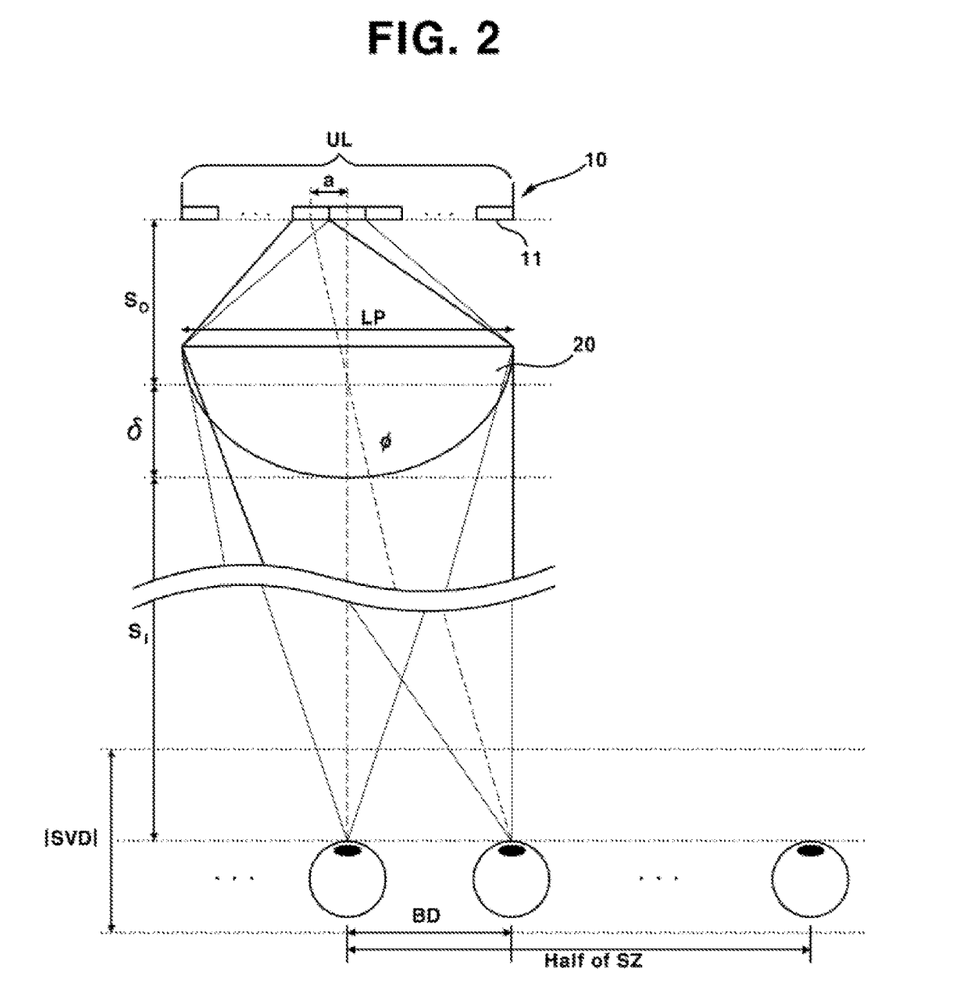
FIG. 2 is an exemplary view illustrating formation of visual field by the unit light source module of FIG. 1.

FIG. 1 is a schematic exemplary view illustrating a unit light source module of a 3D display system according to an exemplary embodiment of the present disclosure, and FIG. 2 is an exemplary view illustrating formation of visual field by the unit light source module of FIG. 1.

Referring to FIGS. 1 and 2, a unit light source module (1) may include a light emitting unit (10) and a light collecting unit (20).

The light emitting unit (10) may be formed with point light sources (10) corresponding to all numbers (n) of viewpoints to be realized (implemented) within a predetermined area, where each point light source (11) can independently realize (implement) a white color, and may be continuously arranged at a predetermined interval (a). That is, as illustrated in FIG. 2, a center distance (a) between the point light source (11) corresponding to a viewpoint may be a function of an observation distance ($S_i$), a distance (BD) between centers of adjacent visual fields, and a distance between the light collecting unit (20) and a distance between light sources ($S_o$), and may be expressed by the following Equation 1.

$$\alpha = \frac{BD \cdot S_o}{S_i + \delta} \approx \frac{BD \cdot S_o}{S_i} \quad \text{[Equation 1]}$$

where, δ is a position of a principal plane of the light collecting unit, and may be a very small value over $S_i$ and can be omitted.

Thus, a horizontal width (UL) of unit light source module (1) may be same as an entire width of integrated point light sources (11). Here, the principal plane is a plane perpendicular to the light collecting unit (20) or to an optical axis passing a center of a lens included in the light collecting unit (20), and means a plane (surface) from which an incident light is refracted. Furthermore, the principal plane may be disposed at an inside or an outside of a lens in response to a total refractivity (refractive power), and a principal plane of a thick lens may be in the number of two, and a principal plane of a thin lens may be in the number of one. An interpretational definition of dividing lenses into a thin lens or a thick lens may depend on paraxial optics.

$$UL = n \cdot a \quad \text{[Equation 2]}$$

Figure 3:
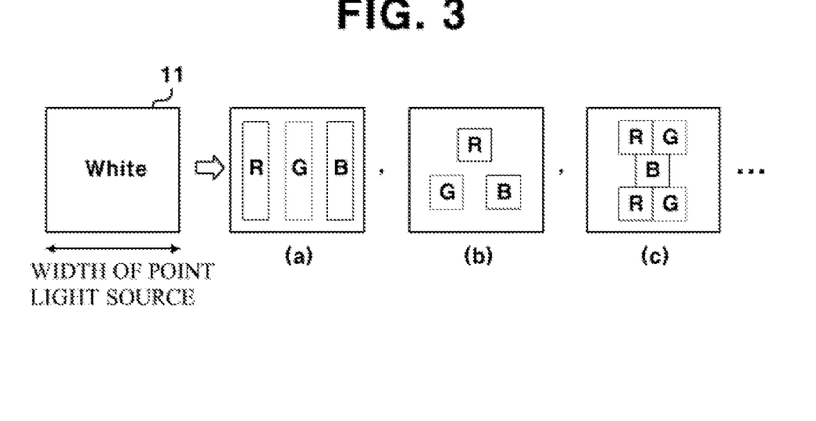
FIG. 3 is a schematic exemplary view illustrating a point light source according to an exemplary embodiment of the present disclosure.

The point light source is a light source (11) capable of realizing a white color. FIG. 3 is a schematic exemplary view illustrating a point light source according to an exemplary embodiment of the present disclosure.

Referring to FIG. 3, the point light source (11) is a light source disposed with a predetermined width to realize a white color and capable of independent driving of RGB. Thus, as illustrated in FIGS. 3(*a*), 3(*b*) and 3(*c*), although RGB pixels may be realized, the present disclosure is not limited thereto and may be configured with various other methods.

At this time, full parallaxes including both the horizontal parallax and the vertical parallax may be realized depending on integration type of the point light source (11), and may also realize the HPO (Horizontal Parallax Only).

Figure 4:
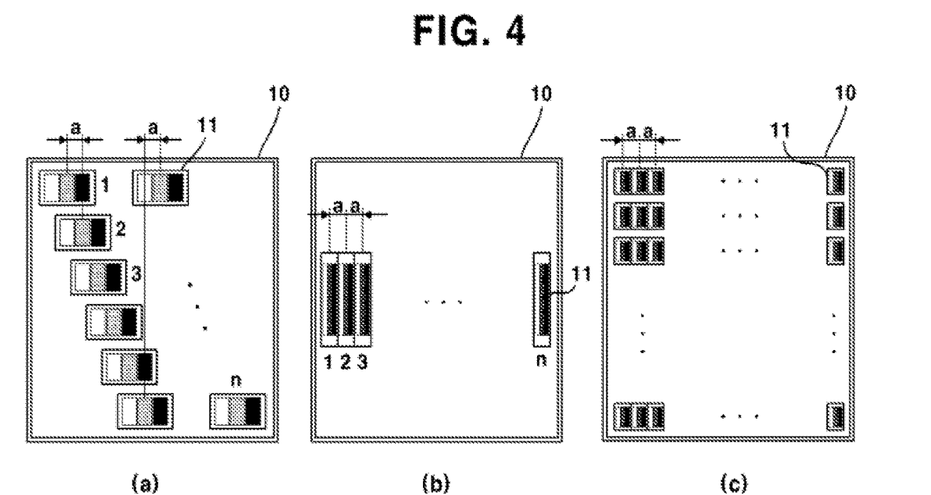
FIG. 4 is an exemplary view illustrating a method for forming a light emitting unit by collecting (converging) point light sources.

FIG. 4 is an exemplary view illustrating a method for forming a light emitting unit by integrating the point light sources.

A width of the point light source (11) corresponding to each viewpoint may be wider or narrower than a center distance (a) between point light sources, and when the width of the point light source (11) is wider than the center distance (a), as in (a), the HPO can be implemented. When the width of the point light source (11) is narrower than or equal to the center distance (a), as in (b), and when the point light source (11) are horizontally integrated as in (b), the HPO can be implemented. However, when the width of the point light source (11) is narrower than or equal to the center distance (a), as in (c), and when the point light source (11) are horizontally and vertically integrated, the full parallaxes can be implemented.

Hereinafter, although the following description has exemplified point light sources integrated as in (a), the present disclosure is not limited thereto and it should be apparent that the point light sources integrated as in (b) and (c) can be also utilized.

Each point light source (11) within the unit light source module (1) can satisfy a center distance (a) between adjacent point light sources, and can be sequentially or simultaneously driven as a unit pixel of each viewpoint image.

In order to drive the point light source (11), a connector for supplying an electric power and data may be connected to the unit power source module (1), and the connector may be connected to a controller (not shown), where a connected configuration thereof will be described later.

The controller (not shown) may sequentially or simultaneously drive the point light source (11) of the light emitting unit (10) at the unit light source module (1).

The controller can maintain the life and stability of each point light source by providing a driving current or voltage of PWM (Pulse Wide Modulation) method in order to enable a light-up of the point light source (11) for 1/(30×n) second, that is, a time in which ⅓₀ second, which is a minimum lighting time for realizing a video of an entire screen, is divided by a maximum number (n) of viewpoint.

The point light sources corresponding in response to sequential increase in the number of viewpoints are sequentially lit, whereby the lighting of the unit light source module (1) can be realized (implemented).

Thus, during implementation of 3D, the brightness of each viewpoint image is equally controlled to allow having a same brightness characteristic free from no brightness degradation for each viewpoint image during implementation of entire viewpoint image, and during implementation of 2D, each viewpoint image is reproduced in the same image, where due to the brightness being increased by n times, the brightness of each viewpoint image is decreased to allow a natural mode change free from difference in brightness during changes between 2D and 3D.

Furthermore, the controller can simultaneously light the point light source (11) corresponding to an entire number of viewpoints in response to configuration of lighting circuit. When the point light sources are continuously driven, it is possible to view images without a flicker effect, even if an viewer is quickly moved when an entire image connected with the unit light source module (1) is viewed. The characteristic of image is same as that of sequential method.

Meantime, each unit light source module (1) may correspond to an image coordinate identical to n number of viewpoint images.

Figure 5:
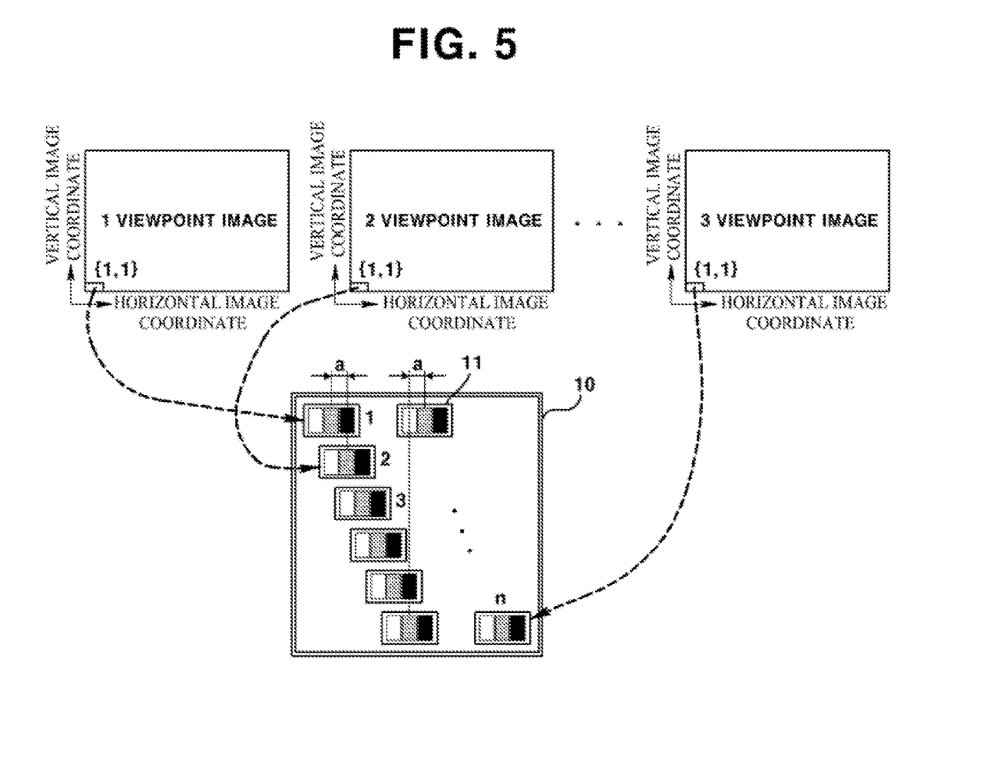
FIG. 5 is an exemplary view explaining that a point light source of unit light source module corresponds to an image coordinate of viewpoint image.

FIG. 5 is an exemplary view explaining that a point light source of unit light source module corresponds to an image coordinate of viewpoint image.

Referring to FIG. 5, the light emitting unit (10) of the unit light source module (1) may correspond to a single image coordinate, and n number of point light source (11) integrated to the light emitting unit (10) may correspond to an image coordinate of a relevant viewpoint image.

Hereinafter, a lens which is a light collecting unit (20) of FIG. 1 will be described.

A center position of each point light source (11) corresponding to the number (n) of viewpoints must pair with a light collecting unit (20) of optical system in order to form a relevant distance on an observation distance. At this time, the light collecting unit (20) takes a shape of a unit lens, and may be applied with a cylinder type lenslet having an optical refractivity of short axis, or a lenslet of rotational symmetry type in optical axis. The former may be applied when in consideration of the horizontal parallax only, and the latter may be applied with when in consideration of full parallax. At the same time, the light collecting unit (20) may include an element of single refractive medium capable of performing a cylinder type lens or a rotational symmetry type lens, or an element of multiple refractive medium forming a difference of optical refractivity between media by an external stimulus in a medium formed with one or more refractive power.

Here, the element of multiple refractive medium may be an active element in response to an electro-wetting element or an active element in response to phase modulation, and optical characteristic of the element of multiple refractive medium is such that a sum of total refractivity formed by external stimulus is a positive value, and may have a function of implementing a real image. That is, the element of multiple refractive medium is such that a sum of total refractivity may become a positive value or a zero (0) depending on presence or absence of external stimulus, through which changing function of 3D/2D can be implemented.

Although FIG. 1 has explained a configuration of light collecting unit (20) by cylinder type lenslet in consideration of horizontal parallax, FIG. 1 is a detailed example for convenience of explanation, and the light collecting unit (20) included in the present disclosure is not limited to the example explained in FIG. 1.

Figure 6:
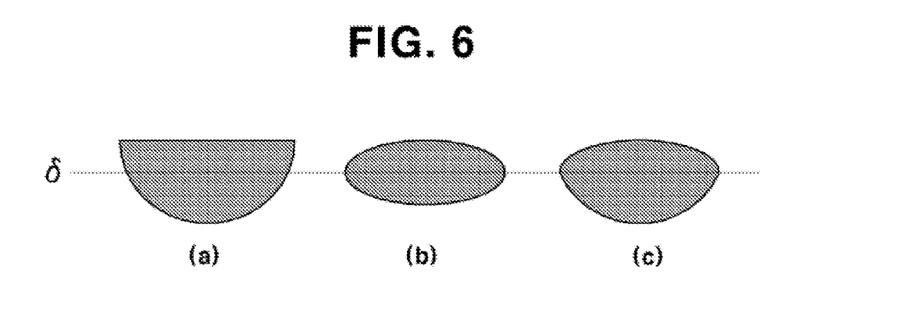
FIG. 6 is an exemplary view illustrating the types of light collecting units.

FIG. 6 is an exemplary view illustrating the types of light collecting units.

Referring to FIG. 6, a cross-sectional shape of a lens forming the light collecting unit (20) may be of a convex lens type of a plano-convex (a), a bi-convex (b), or an equi-convex (c) shape. However, the present disclosure is not limited thereto, and a light collecting element (or convex lens) shape of various types may be also used that satisfies a positive value of a sum of optical refractivity relative to two planes of lens, and that shows an optical characteristic realizing a real image.

An entire optical refractivity of a lens is a function of Si and So, and may be defined by the following Equation 3.

$$\phi = \frac{1}{f} = \frac{1}{S_o + \delta} + \frac{1}{S_i} \approx \frac{1}{S_o} + \frac{1}{S_i} \qquad \text{[Equation 3]}$$

At this time, a thin lens maker's Equation of radical axis may be applied, because, when Si is relatively long even if a lens has a predetermined thickness, the thickness cannot be disregarded, and therefore an Equation of radical axis can be applied.

A lens position may be defined by a case where a distance between a center surface of a lens (the principal plane may be used as a center surface in the radical axis) and the light emitting unit (10) is a bit longer than a focal length ($1/\varphi$) of a lens. When a distance between the center surface of a lens and the light emitting unit (10) is arranged to be equal to the focal length of a lens, a parallel light relative to the lens width advances, such that, when a center distance (BD) of adjacent visual field is narrower than the width of parallel light, a crosstalk with a visual field adjacent to a relevant visual field may be generated and therefore, it is preferable that the distance be made a bit longer than the focal length of a lens.

When a focal length of a lens is first defined, So can be obtained by the relationship as expressed by the above Equation 3.

Now, lens plane will be described in detail. A final curved surface (i.e., surface facing an viewer) of a lens is a spherical surface or an aspherical surface, where a light flux progressing by emitting from a final surface of a lens may take a shape of parallel light having a path parallel with a main light emitted from a unit pixel of each viewpoint image, or a shape of focused light in which an area of light flux focused on a viewing surface of a viewer is minimized. However, a width of a relevant view field formed in a viewer area may be broadened due to reduced optical property caused by spherical aberration in the spherical surface, and therefore, it is worried that an optical crosstalk may be generated.

In case of a lens plane being aspherical, a light flux emitted from each point light source (11) may be shortened in terms of DOF (Depth of Focus) in each visual field based on a viewing surface (focus surface) to enable forming a clear visual field. Thus, an optical crosstalk generated from between adjacent visual field and relevant view field may be reduced to mitigate the obstruction phenomenon during 3D such as a double image or an overlapped image.

At this time, the lens according to the present disclosure is preferred to have an aspherical lens surface, whereby a visual field of narrow width at a viewer's position may be formed to improve the problem of optical crosstalk. More preferably, the lens according to the present disclosure may be an F-theta lens, however, it should be apparent that the present disclosure is not limited thereto.

A distance (LP) between lens centers in adjacent unit light source modules (1) is a function of a width (UL) of the unit light source module (1) and Si, So, and may be defined by the following Equation 4.

$$LP = UL \cdot \frac{(S_i + \delta)}{S_o + (S_i + \delta)} \approx UL \cdot \frac{S_i}{S_o + S_i} \qquad \text{[Equation 4]}$$

where, So is a distance that has considered a distance (BD) between a viewing distance (Si) and an adjacent visual field center on a viewing surface, and δ is a position of a principal plane. LP<UL is satisfied by the above relationship.

In light of the fact that LP is smaller than UL, a center of lens optical axis per unit light source module (1) is deviated from a center as it faces an outside of a final display. Thus, each unit light source module (1) according to the present disclosure has a structure in which a lens is inserted in a manner of a socket to allow a horizontal translational and adjustable motion.

As a result, when lenses in connected unit light source modules (1) horizontally and mutually move to conform to an environment of a designed large-sized display system, the system can provide each super-sized view point image free from degradation in the number of viewpoints, whereby a viewer can view a 3D image with high realism (sense of reality and presence) free from disharmony.

The 3D display system according to the present disclosure is configured by connecting the unit light source modules (1) thus discussed above. First of all, a connected structure of unit light source module (1) will be described.

Figure 7:
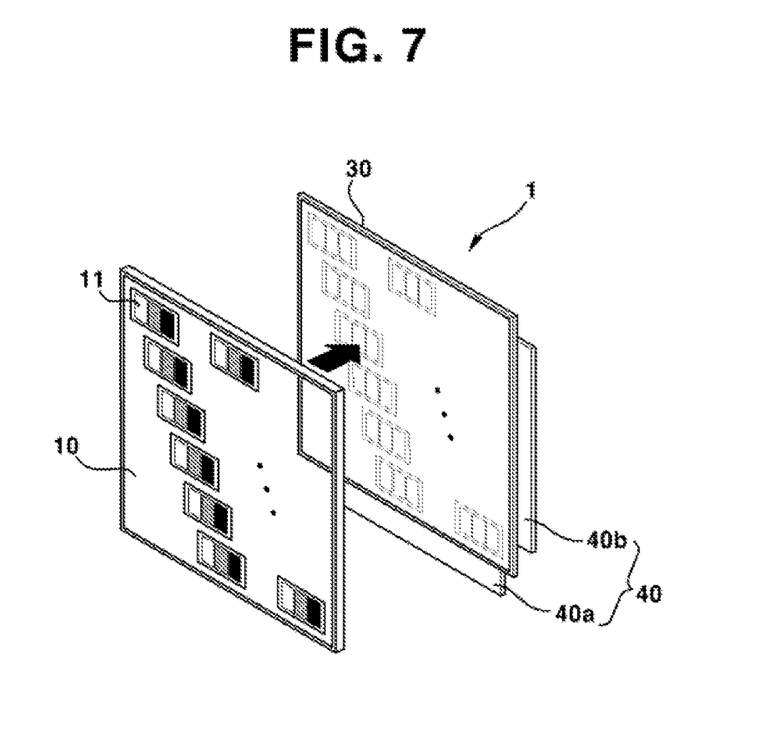
FIG. 7 is an exemplary view illustrating a connected structure of unit light source module.

FIG. 7 is an exemplary view illustrating a connected structure of unit light source module.

Referring to FIG. 7, the unit light source module (1) according to the present disclosure may further include a connection terminal unit (30) arranged at a rear surface of the light emitting unit (10) to provide an electric power applied to the point light source (11) and to provide a grounding for data on a position same as that of each point light source of the light emitting unit (10), and a flexible connecting connector (40) connectible to adjacent unit light source module. The supply of electric power and data can be made through the connecting connector (40).

Each unit power source module (1) can be connected to horizontally and vertically adjoining modules through the connecting connector (40) and can receive electric power and data.

The connecting connector (40) can connect each unit light source module (1) at a rear surface of the connection terminal unit (30), and the connected structure may be implemented in various methods.

Furthermore, the connecting connector (40) may include a horizontal connector (40a) and a vertical connector (40b), where both the horizontal and vertical connectors (40a) and (40b) may be formed with a flexible substrate to allow coping with uneven surface of installation surface, when a large-sized display system is configured.

Figure 8:
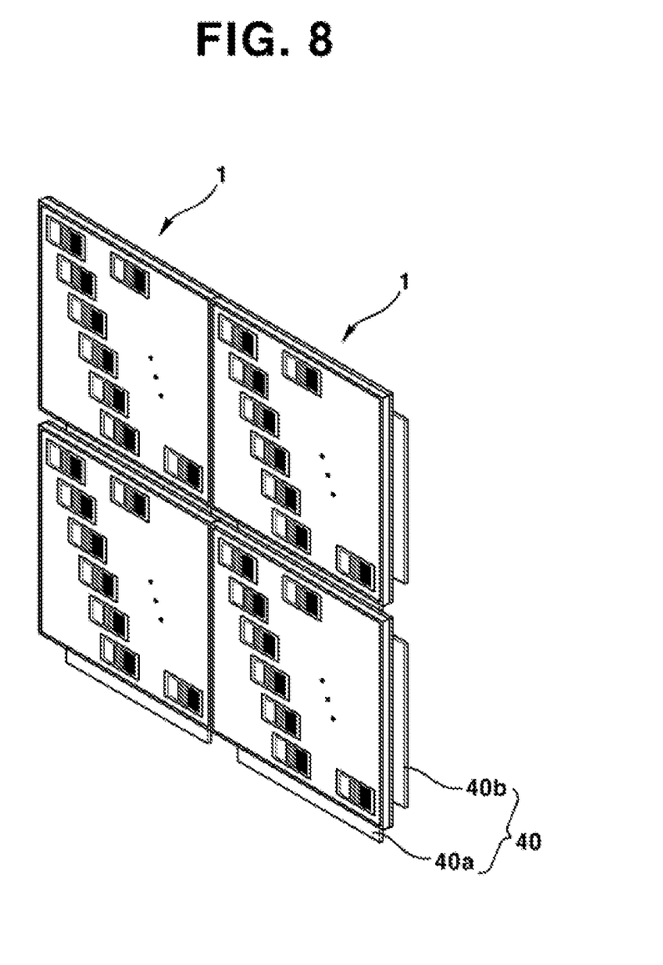
FIG. 8 is an exemplary view illustrating a connected state of unit light source module.

FIG. 8 is an exemplary view illustrating a connected state of unit light source module.

Referring to FIG. 8, it can be noted that each unit light source module (1) can be connected by the connecting connector (40).

Figure 9:
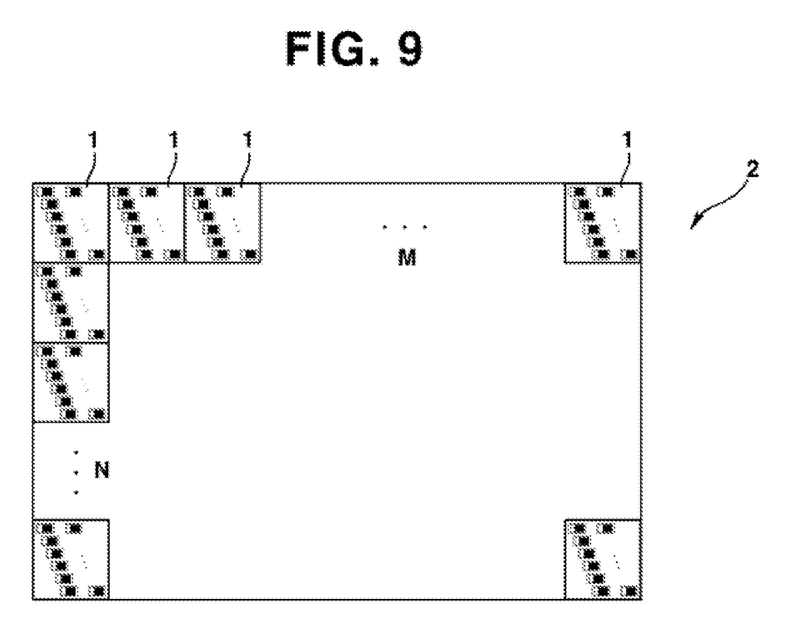
FIGS. 9 and 10 are exemplary views illustrating a 3D display system configured by connecting unit light source modules.
Figure 10:
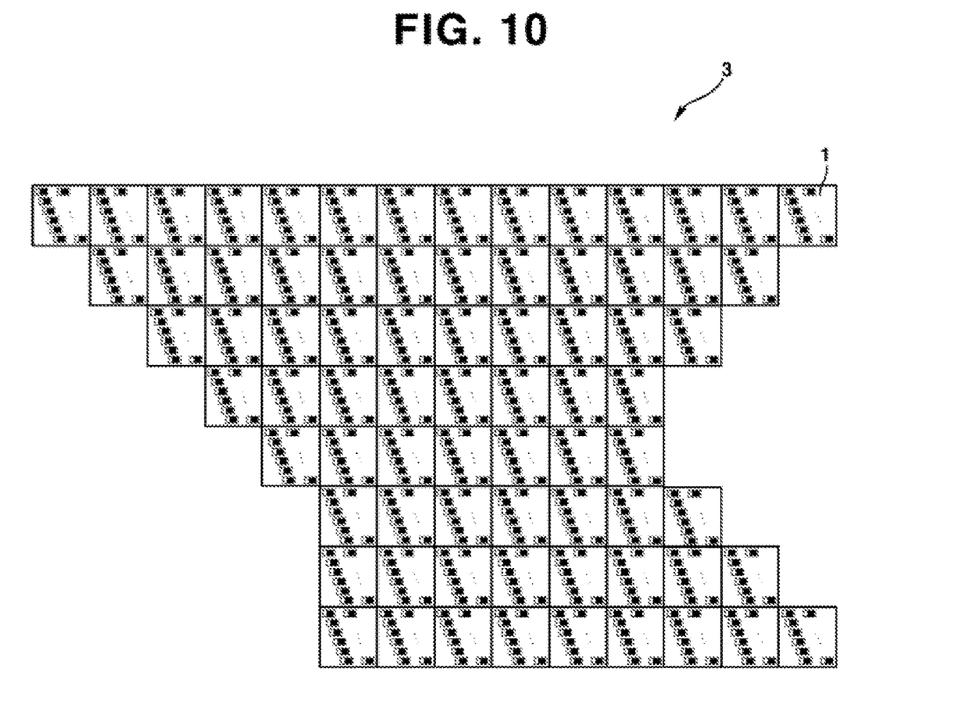

FIGS. 9 and 10 are exemplary views illustrating a 3D display system that is configured by connecting unit light source modules.

As illustrated in FIG. 9, a large-sized display (2) may be implemented by respectively connecting a plurality of unit power source modules (1) (breadth M, length N, i.e., M×N), and as illustrated in FIG. 10, a display (3) may be implemented in response to an installation surface.

As discussed above, enlargement of display may be realized by continuously connecting-arranging the unit light source modules (1) to form one entire display. The following restricting conditions must be met in order to increase or enlarge the size of display:

First, the unit light source module (1) must be allowed to be continuously arranged to horizontal and vertical directions, and each module must be enabled to be independently driven;

Second, a total number (n) of viewpoints, a viewing distance (Si) and a center distance (BD) between adjacent visual fields must be defined in advance, and based on the value thereof, configuration of the unit light source module (10) reflected with curvature of display installation surface and curvature of the installation surface are compensated to enable driving of point light source corresponding to time of change between continuous visual fields forming a center distance between continuous interval visual fields to a horizontal direction on a viewing surface;

At this time, the number (n) of viewpoints may be defined by the following Equation 5.

$$n = \frac{SZ}{BD} + 1 \equiv \text{Round}\left[\frac{SZ + BD}{BD}\right] \quad \text{[Equation 5]}$$

where, SZ is a horizontal width of an entire 3D visual field to be formed by the designed visual range, i.e., a horizontal range in which 3D viewing is enabled.

Third, a width of visual field to a depth direction formed on the viewing surface must satisfy a minimum visual field width of depth direction capable of fully compensating a position difference of visual field center generated in response to a phase difference of each unit light source module based on curvature of installation surface in the following manner.

$$|SVD| = 2SVD = \frac{BD \cdot (S_o + (S_i + \delta))}{DW} \approx \frac{BD \cdot (S_o + S_i)}{DW} \quad \text{[Equation 6]}$$

This means that a phase restriction of installation surface must be within an allowable limit to a depth direction of visual field formed by connection type display.

In the unit light source module (1) of connected type display (in the case of FIG. 9 or FIG. 10) formed on a flat installation surface, a center of visual field formed with chief ray of point light source (11) corresponding to each viewpoint exists on a viewing surface in which viewing distances (Si) are horizontally connected. Thus, a Rayleigh length (a length corresponding to twice the length of beam waist of focal plane) of visual field forming lens forming a pair with the unit light source module (1) may be viewed as a same focal plane to become an allowable limit of installation surface curvature phase. This Rayleigh length is named as SVD, and defined by the Equation 6. Thus, because the phase of the installation surface has + and −, such that SVD may be double-fold.

Figure 11:
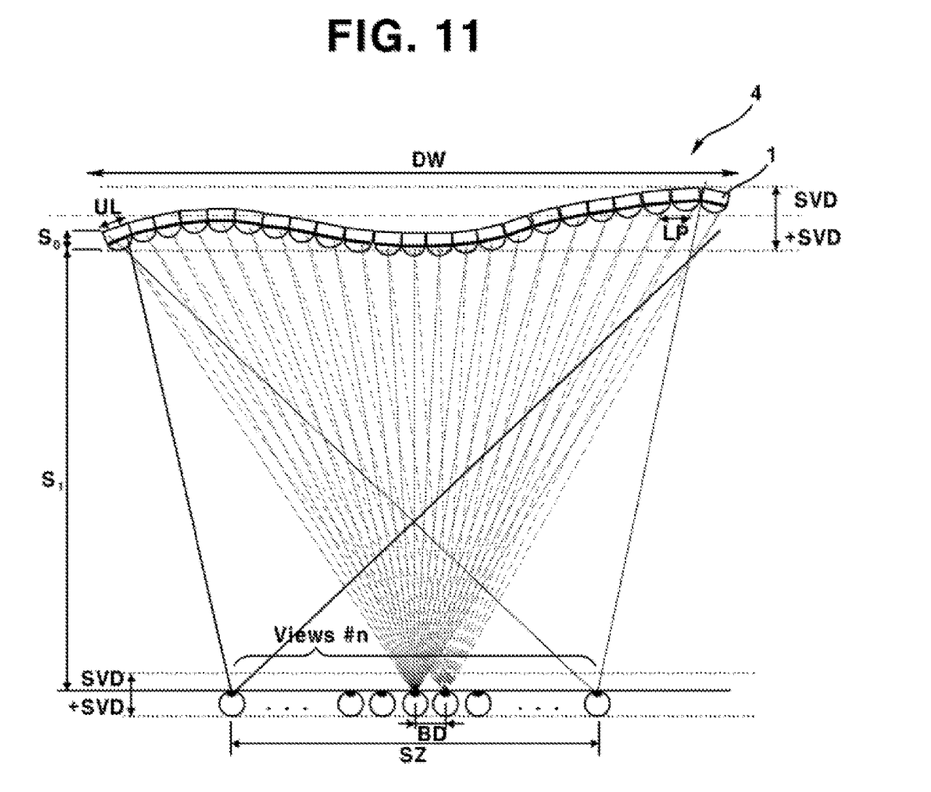
FIG. 11 is an exemplary view illustrating a 3D display system in response to an installed curved surface.

FIG. 11 is an exemplary view illustrating a 3D display system in response to an installed curved surface.

As a result, when the above principal restricting conditions are satisfied, a super large auto-stereoscopic 3D display (4, glasses-free 3D display) reflected with the curvature of installation surface can be implemented, and in case of configuring an entire screen using the unit light source module (1) in response to the number of viewpoints, no resolution degradation for each viewpoint image exists, and a viewable area (SZ=(n−1)×BD) during 3D is broadened as the number of point light sources within the unit light source module (1) increases (to a horizontal direction), and motion parallax is also increased, whereby a natural 3D viewing with high realism (sense of reality and presence) free from disharmony, a low crosstalk and a high motion parallax can be provided.

Figure 12A:
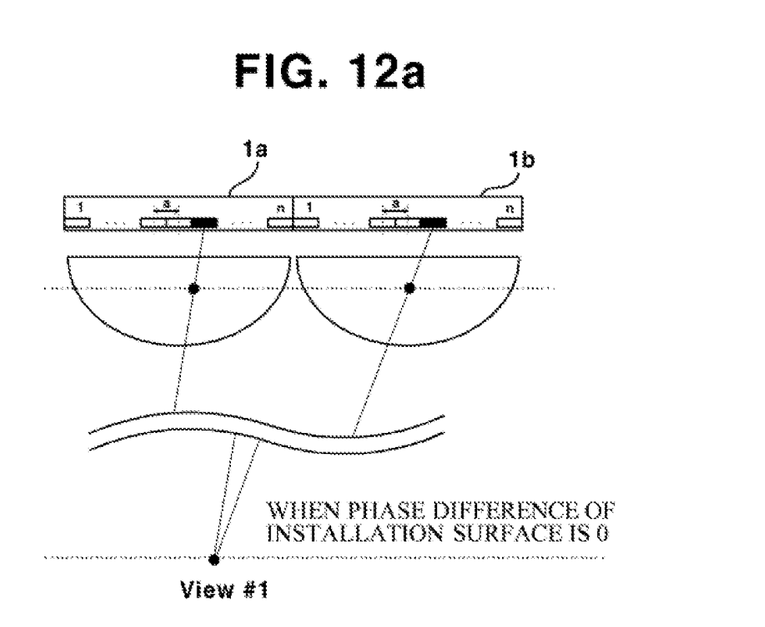
FIGS. 12a and 12b are exemplary views illustrating a point light source being differentially driven by a curved surface display.
Figure 12B:
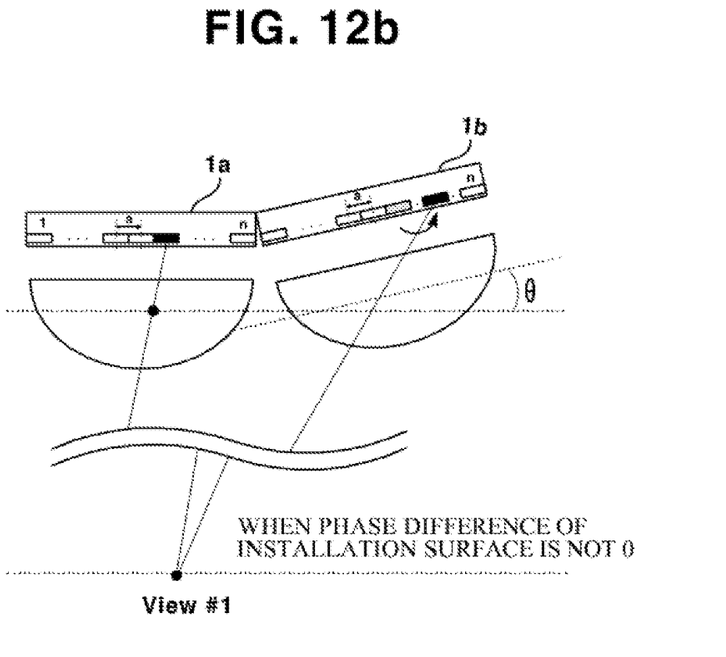

FIGS. 12a and 12b are exemplary views illustrating a point light source being differentially driven by a curved surface display.

As illustrated in FIG. 12a and in case of flat installation surface, that is, when a phase difference of installation surface is, it can be noted that addresses of point light source that are driven in response to a certain viewpoint (#1) are same in the plurality of unit light source modules (1a, 1b) in order to form the same visual field.

However, when the phase difference of installation surface is not zero (0), when the point light sources of same address are lit, a visual field corresponding to a relevant visual field cannot be formed.

Thus, as illustrated in FIG. 12b, the present disclosure can form a visual field corresponding to a relevant viewpoint by changing address of point light source forming a same visual field in the unit light source module (1) generated with a phase difference in consideration of a phase difference (θ) of the installation surface, when the phase difference of the installation surface is not zero (0).

As discussed above, the present disclosure can solve the enlargement problem, which is a disadvantage of conventional single panel method, and can provide a natural 3D image with high resolution and high realism (sense of reality and presence) free from disharmony.

Hence, the present disclosure can be utilized in super large 3D advertisement-display fields for installation on exterior wall of curved or flat surface and for outdoor installation, and can realize a free shaped display by connecting unit light source modules in response to a free shape of installation surface.

In addition, the present disclosure can realize a 3D image of horizontal, vertical, or horizontal/vertical single/full parallax based on arrangement of point light sources within a unit light source module, whereby an improved large holographic display can be implemented.

The previous descriptions of the present disclosure are provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

The invention claimed is:

1. A unit light source module of 3D display system, the unit light source module comprising:
a light emitting unit including a plurality of point light sources corresponding to a number of viewpoints; and
a light collecting unit configured to output a light outputted from said plurality of point light sources by collecting the light while being spaced apart at a predetermined distance from said light emitting unit,
wherein said plurality of point light sources is arranged for implementing only one of a horizontal parallax and a vertical parallax or both of the horizontal parallax and the vertical parallax based on:
a relationship in size between a width of each point light source and a center distance between adjacent point light sources; and
a direction in which the plurality of point light sources arranged.

2. The unit light source module of claim 1, wherein each of said plurality of point light sources is independently implementable of white color, and is continuously arranged along the center distance.

3. The unit light source module of claim 1, wherein the center distance between adjacent point light sources is determined by viewing distance, a center distance of an adjacent visual field, and a distance between said light collecting unit and said light emitting unit.

4. The unit light source module of claim 1, wherein when the width of each point light source is wider than the center distance between adjacent point light sources, only the horizontal parallax of the horizontal parallax and the vertical parallax is implemented by the plurality of point light sources.

5. The unit light source module of claim 1, wherein when the width of each point light source is narrower than or equal to the center distance between adjacent point light sources and the plurality of point light sources are arranged in a horizontal direction, only the horizontal parallax of the horizontal parallax and the vertical parallax is implemented by the plurality of point light sources, and
when the width of each point light source is narrower than or equal to the center distance between the adjacent point light sources and the plurality of point light sources are arranged in both the horizontal direction and a vertical direction, both the horizontal parallax and the vertical parallax are implemented by the plurality of point light sources.

6. The unit light source module of claim 1, wherein said plurality of point light sources responds to an image coordinate of an image corresponding to the number of viewpoints.

7. The unit light source module of claim 1, wherein said light collecting unit includes a cylinder type lens or a rotational symmetry type lens.

8. The unit light source module of claim 1, wherein said light collecting unit includes an element of single refractive medium or multiple refractive medium configured to perform the function of cylinder type lens or rotational symmetry type lens.

9. The unit light source module of claim 8, wherein said element of multiple refractive medium forms a difference of optical refractive power between media in response to external stimulus in a medium formed with one or more refractive indexes.

10. The unit light source module of claim 8, wherein an optical property in said element of multiple refractive medium is such that a sum of total refractive powers formed by external stimulus is a positive value and implements a real image.

11. The unit light source module of claim 8, wherein said element of multiple refractive medium is such that a sum of total refractive powers is a positive value or zero depending on whether external stimulus is present or absent, through which a function of changing 3D/2D is implemented.

12. The unit light source module of claim 8, wherein a cross-section of a lens in said element of single refractive medium includes any one of plano-convex, bi-convex and equi-convex, and a sum of total refractive powers is a positive value, and a real image is implemented.

13. The unit light source module of claim 7, wherein a distance between a principal plane of the lens of said light collecting unit and said light emitting unit is set in response to an object distance in a lens maker's Equation.

14. The unit light source module of claim 7, wherein a final curved surface of the lens of said light collecting unit is a spherical surface or an aspherical surface.

15. The unit light source module of claim 14, wherein the lens of said light collecting unit takes a parallel light type in which light flux that proceeds by being emitted from a final curved surface of the lens of said light collecting unit has a path parallel with a principal light emitted from a unit pixel of each viewpoint image, or takes a convergent light type in which an area of light flux converged on viewing surface positioned by a viewer is minimized.

16. The unit light source module of claim 4, wherein said point light sources are diagonally integrated to only implement the horizontal parallax.

17. The unit light source module of claim 1, wherein said light collecting unit is so arranged as to be spaced apart at a predetermined distance from said light emitting unit to enable a translational motion to a horizontal direction.

18. The unit light source module of claim 1, further comprising:
a power source applied to said plurality of point light sources at a same position as that of said plurality of point light sources of said light emitting unit and a connection terminal unit to which grounding of data is provided; and
a connector provided on at least two corners of said connection terminal unit in order to be connected with adjacent unit light source modules.

19. The unit light source module of claim 18, wherein the unit light source module operates as a unit pixel such that when a plurality of the unit light source modules are arranged on a curved installation surface, the unit light source module forms a same visual field by changing a position of the plurality of point light sources configured to light up in response to a phase difference of the installation curved surface.

20. A 3D display system, the 3D display system comprising;
a plurality of unit light source modules;
each unit light source module including,
a light emitting unit including a plurality of point light sources corresponding to a number of viewpoints, said plurality of point light sources being arranged for implementing only one of a horizontal parallax and a vertical parallax or both of the horizontal parallax and the vertical parallax based on:
a relationship in size between a width of each point light source and a center distance between adjacent point light sources; and
a direction in which the plurality of point light sources is arranged,
a light collecting unit configured to output a light outputted from said plurality of point light sources by collecting the light while being spaced apart at a predetermined distance from said light emitting unit,
a power source applied to said plurality of point light sources at a same position as that of said plurality of point light sources of said light emitting unit,
a connection terminal unit to which grounding of data is provided,
a first connector configured for connecting adjacent unit light source modules together, and
a second connector configured for connecting adjacent unit light source modules together; and
a controller configured to provide a driving signal for controlling said plurality of point light sources through said first and second connectors.

21. The 3D display system of claim 20, wherein said first and second connectors include a flexible substrate.

22. The 3D display system of claim 21, wherein said plurality of unit light source modules is arranged on a planar installation surface.

23. The 3D display system of claim 22, wherein said controller sequentially drives a point light source corresponding to a predetermined viewpoint at said plurality of unit light source modules.

24. The 3D display system of claim 21, wherein said plurality of unit light source modules is arranged on an installation surface, which is a curved surface.

25. The 3D display system of claim 24, wherein said controller controllably forms a same visual field by changing a position of a point light source configured to light up in response to a phase difference of point light source in case of an installation surface being flat, when a phase difference of any one installation surfaces in said plurality of unit light source modules is generated.

* * * * *